United States Patent [19]

Fowler et al.

[11] 4,297,699
[45] Oct. 27, 1981

[54] RADAR DRILL GUIDANCE SYSTEM

[75] Inventors: James C. Fowler, Burke; Steven D. Hale, Vienna, both of Va.; Theodore E. Moser, Rockville, Md.

[73] Assignee: Ensco, Inc., Springfield, Va.

[21] Appl. No.: 87,811

[22] Filed: Oct. 24, 1979

[51] Int. Cl.³ .............................................. G01S 13/02
[52] U.S. Cl. .................. 343/5 NA; 175/41; 324/338
[58] Field of Search ........... 343/5 NA; 324/337, 338; 175/41

[56] References Cited

U.S. PATENT DOCUMENTS

| | | | |
|---|---|---|---|
| 3,412,815 | 11/1968 | Holser et al. | 324/338 X |
| 4,045,724 | 8/1977 | Shuck et al. | 324/338 |
| 4,161,731 | 7/1979 | Barr | 343/5 NA X |
| 4,218,678 | 8/1980 | Fowler et al. | 343/5 NA X |

OTHER PUBLICATIONS

David L. Moffatt et al.; A Subsurface Electromagnetic Pulse Radar; Geophysics, vol. 41, No. 3 (Jun. 1976), pp. 506-518.

*Primary Examiner*—T. H. Tubbesing
*Attorney, Agent, or Firm*—Sixbey, Friedman & Leedom

[57] ABSTRACT

The present invention comprises a short-pulse radar guidance tool which determines borehole-to-roof and borehole-to-floor distances along a coal seam by measuring the travel times of electromagnetic pulses transmitted from the tool and reflected back to a receiving antenna in the tool from the interface at the roof or floor of the coal seam. The tool includes a high frequency electromagnetic pulser, a directional transmitting antenna, a directional receiving antenna, a battery power source, and control circuitry for performing all control and transmitting/receiving functions at the tool location. Placement of the transmitting antenna at a point intermediate the control circuitry and the receiving antenna acts to reduce indirect electromagnetic coupling between the antennas. Circuit isolators are used to further attenuate RF crosstalk occuring between the control circuitry and the receiving antenna.

19 Claims, 6 Drawing Figures

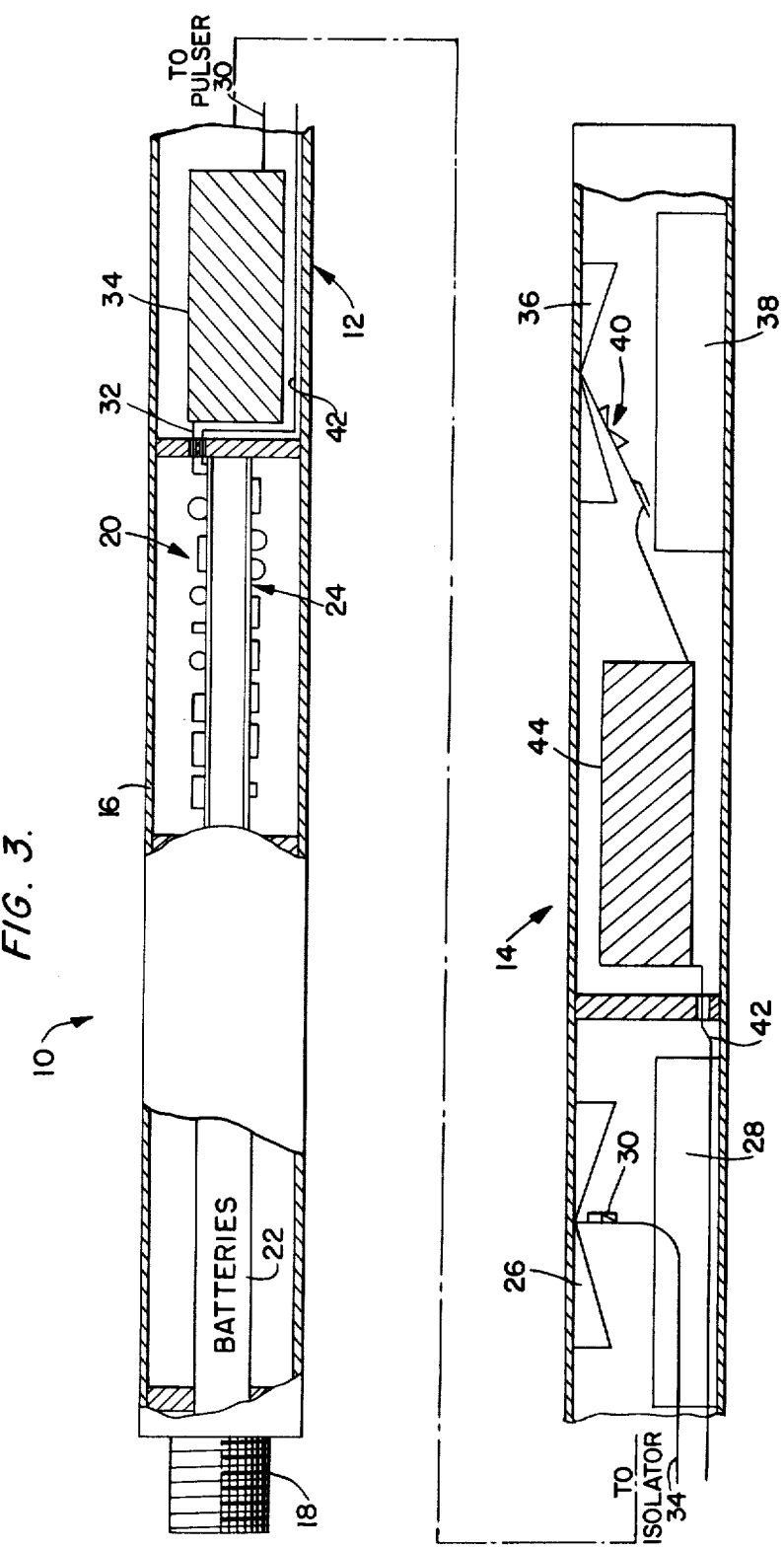

RADAR DRILL GUIDANCE SYSTEM

DESCRIPTION

1. Technical Field

The present invention relates to a radar drill guidance system for mapping coal seam dimensions, and more particularly to an improved borehole radar tool for use in determining borehole-to-floor and borehole-to-roof distances.

2. Background Art

Many types of mining activities require exact knowledge of the size and location of various subterranean geological features. A drill operator engaged in the underground mining of coal, for example, must be able to accurately determine the boundaries of a coal seam if the movement of the drill through the seam is to be properly guided. Furthermore, geological discontinuities such as sand channels may be encountered during drilling operations, and it is necessary to ascertain the extent of the coal on the other side of the sand channel in order to decide whether continued drilling beyond the channel is economically justified. In such situations, it would be of obvious advantage to have a compact, portable and self-contained drill guidance system which utilizes proven radar technology to obtain accurate and reliable measurements of roof and floor thicknesses in the coal seam.

Several methods of mapping coal seam boundaries have heretofore been proposed. U.S. Pat. No. 3,823,787, issued to Haworth et al on July 16, 1974, describes a drill hole guidance system wherein radiation from a source of radiation such as Cesium 137 is back-scattered off wall rock surrounding a coal seam and is detected by a radiation counter which thereafter generates a control signal to cause the drill to bore a hole at a prescribed distance from the top or bottom of the seam. U.S. Pat. No. 3,961,307, issued to Hochheimer on June 1, 1976, discloses another means for exploring the boundaries of an underground coal seam wherein the time lapse between emission of monochromatic coherent sound waves from an underground test station and reception of the sound waves following their reflection at a discontinuity in the seam provide an indication of the distance between the reflecting discontinuity and the test station. But regardless of the merits of the Haworth et al and Hochheimer systems, neither of these prior art patents teaches anything of value concerning the application of radar to coal seam mapping.

Several factors must be taken into account if radar technology is to be successfully employed in a coal drilling guidance system. Coal seam boreholes are typically only three or four inches in diameter and the radar components, including the antenna structure and its accompanying electronics, must be sufficiently reduced in size to fit within the borehole. Geophysical exploration systems employing electromagnetic waves to locate geological formations have been developed in the field of well logging, and these systems contain numerous structural elements specifically designed to function within borehole environments. For instance, U.S. Pat. No. 3,449,657, issued to Fredricksson et al on June 10, 1969, discloses a reduced-diameter helical antenna which is fitted inside a standard size borehole to irradiate sub-surface earth formations with electromagnetic energy in a plane transverse to the axis of the borehole.

In spite of the compactness achieved by the Fredriksson et al device, much of the radar control circuitry associated therewith must still be located outside of the borehole, and a logging cable connecting the antenna to this outside circuitry is necessary in order to communicate control signals down the borehole to the antenna. Changes in both the size of a borehole and the electrical properties of the surrounding earth along the length of a borehole, however, tend to create variations in the antenna impedance sensed by the transmitting or receiving electronics of a borehole radar system. Consequently, lengthy radar control wires such as those required by the Fredriksson et al device will cause improper impedance terminations, and ringing due to reflections within the antenna structure itself will result.

It is, of course, impossible to construct borehole radar tool control wires which perfectly match the varying impedance of a borehole radar antenna. Nevertheless, the ringing problem caused by improper impedance terminations can be minimized if the control wires are made as short as possible. One embodiment of U.S. Pat. No. 3,412,815, issued to Holser on November 26, 1968, does disclose a borehole radar tool wherein the power supply and timing systems for the tool are positioned inside the tool itself. But the configuration of the Holser et al device, although eliminating some of the undesirable characteristics attributable to lengthy control wires, is not well suited for use in coal seam mapping operations.

Borehole-to-roof and borehole-to-floor distances in coal seams are often relatively short, ranging anywhere from six feet to less than one foot. Travel times between the borehole and the roof or floor interfaces are likewise short, and reflected pulses often arrive at the receiver while pulses are still being emitted by the transmitter. The transmitting and receiving apparatus must therefore both be active at the same time, causing transmitter control signals to overlap receiver control signals. The correspondingly energized transmitter and receiver circuit leads then tend to act as RF antennas themselves, creating an electromagnetic coupling phenomena between the transmitter and the receiver and inducing spurious responses in the receiver electronics. The Holser et al device discussed above does not provide any means for alleviating this indirect coupling problem in borehole radar circuit components.

Other Holser et al embodiments employ a dielectrically loaded directive horn antenna to transmit electromagnetic energy pulses and a separate dielectrically loaded directive horn antenna for receiving reflected pulses. The existence of separate transmitting and receiving antennas in a radar guidance system designed to function in situations involving short distances creates additional coupling problems. Where the reflective interface is relatively close to the transmitting antenna, the receiving antenna must also be close to the transmitting antenna in order to effectively detect reflected pulses. However, placing a receiving antenna in proximity to a transmitting antenna tends to create overloading in the receiver as a result of direct electromagnetic radiation from the transmitter, and it is thus difficult to bring a short range radar guidance system with separate receiving and transmitting antennas into condition for reception of reflected pulses.

One attempt to solve the problem caused by short reflective distances and correspondingly short electromagnetic travel times can be found in U.S. Pat. No. 3,806,795, issued to Morey on Apr. 23, 1974, wherein a single broadband antenna is employed to transmit as well as receive electromagnetic energy. The Morey system radiates impulse-excited, short duration electromagnetic pulses with rise times on the order of one nanosecond and frequencies up to 400 MHz. The antenna is quickly damped following transmission to ready the system for receiving reflections. The combination of short pulse widths and antenna damping enable Morey to obtain acceptable measurements for reflective interfaces located at distances of four to five feet from the antenna.

Short duration electromagnetic pulses (a detailed description of these pulses, which form a radar known as short-pulse radar, may be found in U.S. Pat. No. 4,008,469, issued to Chapman on February 15, 1977) can enhance the short range capability of a radar drill guidance system. However, it is often desirable to measure mineral boundaries or other geological discontinuities within distances of one foot or less from the detecting tool, and the apparatus disclosed in U.S. Pat. No. 3,806,795 to Morey is incapable of acurately obtaining such measurements. For example, the propagation velocity of electromagnetic energy in coal is about 0.5 ft./nsec. If a drill operator were attempting to orient his drill relative to a coal seam boundary located exactly one foot from the borehole, an exploratory electromagnetic pulse radiating from an antenna in the borehole would take approximately 4 nanoseconds to travel from the antenna to the boundary and back again. Even where short-pulse radar is employed, the transmitted and received pulses would often overlap and it would be difficult, if not impossible, to damp a single antenna configuration such as Morey's sufficiently to detect the return signal. Moreover, a high frequency pulses tend to introduce ringing into a single transmit/receive antenna structure. Consequently, the preferred method for obtaining electromagnetic measurements of relatively short distances utilizes separate transmitting and receiving antennas designed to avoid electromagnetic coupling between the antennas.

U.S. Pat. No. 3,440,523, issued to Gabillard on Apr. 22, 1969, specifically recognizes that it is not practical to employ the same antenna both for emission and reception of electromagnetic energy in situations where an echo pulse reflected from a geological discontinuity arrives at the antenna before the emitter has stopped emitting pulses and while the receiver is still saturated with energy from the emitter. The method proposed in Gabillard calls for the use of a rectilinear emitter in conjunction with a receiving frame mounted to rotate about its vertical axis in a manner tangential to the cylindrical surface of revolution about the axis of the emitter, thereby furnishing a means for preventing the emitted radiation from saturating from receiver. Although this method eliminates the problems caused by direct electromagnetic coupling between the transmitting and receiving antennas, the problem of indirect coupling between the transmitter control wiring and the receiving antenna is not addressed in the Gabillard patent. Furthermore, the Gabillard apparatus must be controlled from outside the borehole, and the impedance problems previously discussed also remain.

DISCLOSURE OF INVENTION

It is therefore the object of the present invention to provide a new and improved drill guidance means for mapping the boundaries of a mineral seam through the use of radar technology.

It is an additional object of the present invention to provide a radar drill guidance means wherein the radar circuitry is sufficiently reduced in size to fit within a borehole tool which is capable of being inserted into standard sized boreholes.

It is yet an additional object of the present invention to provide a radar drill guidance means wherein all of the control and transmitting/receiving functions are performed at the down-hole location of the borehole tool.

It is a further object of the present invention to provide a radar drill guidance means capable of detecting geological discontinuities at distances of less than one foot.

It is also an object of the present invention to provide a radar drill guidance means which employs separate transmitting and receiving antennas to detect geological discontinuities while minimizing electromagnetic coupling between the antenna structures.

The present invention basically comprises a short-pulse radar guidance system employing a radar tool which is inserted into a borehole drilled along a coal seam. High frequency electromagnetic pulses are transmitted from the tool and reflected back to a receiving antenna in the tool by a coal-shale interface at the roof or floor of the coal seam. Travel times of the reflected pulses are continuously measured as the tool moves through the borehole to provide an indication of borehole-to-roof and borehole-to-floor distances. The radar tool, which is approximately 5 feet long and 2 and ⅜ inches in diameter, includes a high frequency electromagnetic pulser, a directional transmitting antenna, a directional receiving antenna, control electronics and a battery power source. The circuit components are specially configured to fit into the small diameter of the tool. The control circuitry performs all control and transmitting/receiving functions at the tool location, thus eliminating the need for downhole control communication lines while minimizing the ringing resulting from improper impedance terminations within the circuitry. Placement of the transmitting antenna at a point intermediate the control circuitry and the receiving antenna acts to reduce indirect electromagnetic coupling between the antennas. Circuit isolators are used to further attenuate the RF crosstalk occuring between the control circuitry and the receiving antenna. The isolators are constructed from coaxial cable coiled to provide maximum length in minimum space, and are respectively connected in series with the portions of the control wiring leading to both the transmitting and receiving antennas. Metal shielding foil attached to the inside of the tool may also be used to block the direct passage of electromagnetic waves between the transmitting and receiving antennas.

BRIEF DESCRIPTION OF THE DRAWINGS

The various features, objects and advantages of the present invention will become apparent from the following detailed description taken in conjunction with the accompanying drawings wherein:

FIG. 3 is a cross-sectional view of the radar tool itself;

BEST MODE FOR CARRYING OUT THE INVENTION

Figure 1:
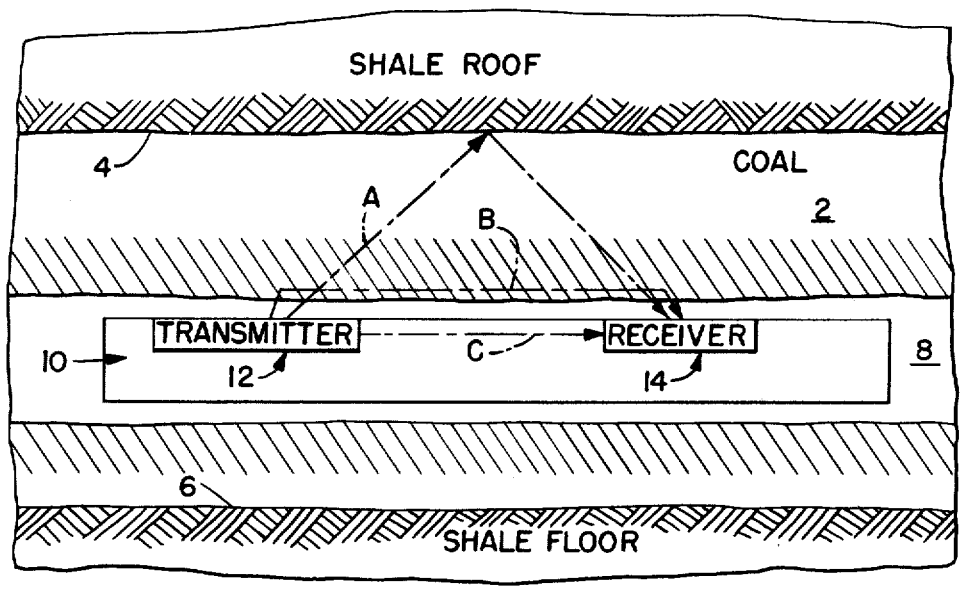
FIG. 1 is an illustrative diagram showing the basic operation of the radar tool in a coal seam borehole.

The general operation of the radar drill guidance system of the present invention is shown in FIG. 1. A coal seam such as that indicated at 2 is frequently surrounded by shale, thereby creating a coal-shale interface 4 at the seam roof and another coal-shale interface 6 at the seam floor. A borehole 8 is drilled into the coal seam, and information concerning the orientation of the borehole relative to the seam roof and floor is obtained by inserting the radar tool of the present invention, indicated generally at 10, into the borehole. A directional transmitter 12 inside the tool radiates electromagnetic energy in the form of short-pulse radar wavelets through the coal to one of the coal-shale interfaces, as indicated by path A. Some of the electromagnetic energy is thereafter reflected back to a directional receiver 14 positioned in the tool adjacent the transmitter. The time lapse between transmission and reception of the radar pulses is then determined and used to provide a measure of the distance between the borehole and the interface.

Because transmitter 12 and receiver 14 are directional, the radar pulses can only be propagated in a single direction, and thus the tool can only map one interface at a time. As shown in FIG. 1, the distance between borehole 8 and the coal-shale interface 4 at the roof of the seam is being mapped. When the measure of the distance between the borehole and the coal-shale interface 6 at the floor of the seam is desired, tool 10 must be rotated to bring transmitter 12 and receiver 14 into alignment with the floor interface.

Not all of the electromagnetic energy emitted by transmitter 12 travels along path A to receiver 14. On the contrary, the pulses may follow numerous paths between the two units. Some of the pulses, for example, travel from the transmitter to the receiver through coal on the borehole wall. These pulses follow the path indicated at B in FIG. 1. Other pulses may travel directly through the air between the transmitter and the receiver along path C.

Figure 2:
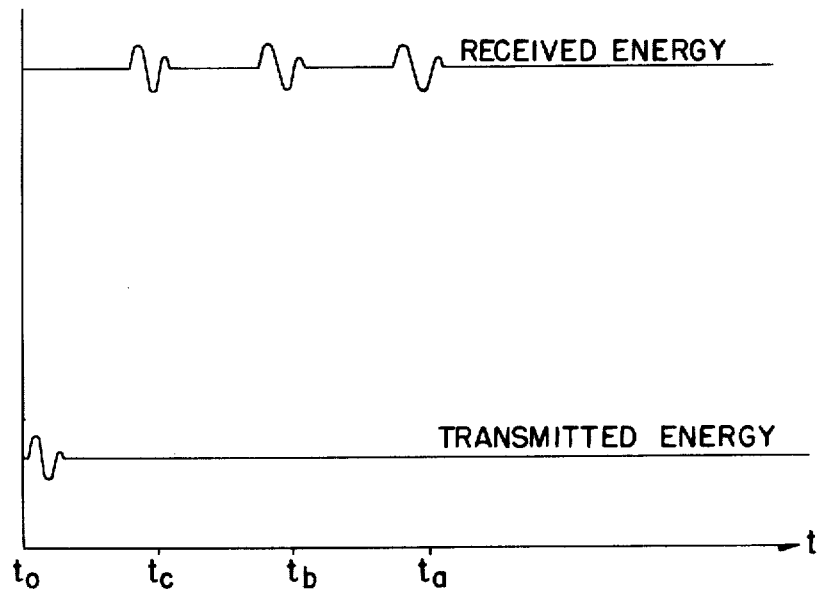
FIG. 2 is an illustrative diagram representing the various high-frequency electromagnetic pulses transmitted and received by the radar tool.

The various transmitting mediums and distances involved create a multiple pulse pattern at receiver 14, as idealized in FIG. 2. At some time $t_o$, transmitter 12 emits a one to two nanosecond burst of energy. The energy pulses travelling through the air along path C will reach receiver 14 first, at time $t_c$. Path B is slower than path C because the propagation velocity of electromagnetic energy in coal (approximately 0.5 ft./nsec.) is about one-half the propagation velocity of electromagnetic energy in air. Thus, pulses travelling along path B reach receiver 14 at some time $t_b$ after $t_c$. Path A, the path dependent upon the distance between borehole 8 and coal-shale interface 4, also passes through coal but is longer than path B, and consequently the pulses travelling along path A arrive at receiver 14 at a time $t_a$ after $t_b$.

The pulse pattern shown in FIG. 2 is seldom realized in practice, due to the multiplicity of transmission paths available to the electromagnetic energy. Changes in the electrical properties of the coal seam itself also reflect a certain amount of energy short of the coal-shale interface, and inconsistencies in the borehole wall combined with limitations in transmitting and receiving antenna designs results in pulses which are not as short or well defined as those in FIG. 2. It is accordingly impossible to examine the pulse pattern at the receiver and clearly distinguish one reflected pulse from another.

Data interpretations of the received pulses must instead be based on changes in the pulse patterns as the radar tool transmitter and receiver are moved along the borehole. Paths B and C remain constant regardless of the position of the tool, but irregularities in the coal-shale interface 4 at the roof of the seam cause the dimensions of path A and the corresponding reflected pulse travel times to vary. It is therefore possible to identify pulses received from path A by noting that portion of the pulse pattern which changes relative to the remainder of the pulse pattern in response to movement of the tool. Pulses so identified may thereafter be used to obtain the desired measurement of borehole-to-roof or borehole-to-floor distances.

A sectional view of borehole radar tool 10 is shown in FIG. 3. The radar tool 10 includes a tubular casing 16 with threads 18 at one end for mating the tool to a conventional drill rod. The casing, which may be formed from high impact plastic or other suitably durable material, is approximately five feet long and two and three quarters inches in diameter. An electronic controller 20 powered by batteries 22 and power supply circuit 24 is contained within the casing. Controller 20 performs all of the control functions necessary to the transmitting and receiving operations of the tool, thereby eliminating both the need for any down-hole communication of control signals and the lengthy control wires associated therewith. The elimination of lengthy control wires in turn minimizes the problem of ringing due to improper impedance terminations caused by the inability to match impedances between the receiver electronics and the receiving antenna as previously discussed.

Transmitter 12 is located at a point intermediate controller 20 and receiver 14, and includes a bow-tie shaped dipole transmitting antenna 26 positioned adjacent tool casing 16. Capacitively coupled resistive loading may be employed at each end of antenna 26 to permit use of the wider bandwidths which normally accompany the broadband frequency spectrum of short-pulse radar wavelets. A transmitting antenna reflector 28 positioned below transmitting antenna 26 causes electromagnetic energy to radiate from the front of antenna 26 at twice the intensity of the energy radiating from the back. The energy received at the front of receiver 14 will thus be four times that received at the back, insuring the directionality necessary to map roof or floor interfaces.

Pulses with frequencies in a range from 200 MHz to 1 GHz are supplied to transmitting antenna 26 by a high frequency electromagnetic pulser 30 in response to timing signals generated by controller 20 and fed to pulser 30 through control lead 32. A transmitting isolator 34 is constructed from coiled coaxial cable and connected in series with control lead 32 between controller 20 and pulser 30. The functioning of isolater 34 is more fully explained hereinbelow.

Receiver 14 includes a bow-tie shaped dipole receiving antenna 36 which is also positioned adjacent tool casing 16 and is oriented in the same manner as transmitting antenna 26. A receiving antenna reflector 38 imparts a directionality to receiving antenna 36 corresponding to the directionality of the transmitting antenna and reflector combination 26, 28. Receiver circuitry 40 connected to receiving antenna 36 is actuated in response to strobe signals generated by controller 20 and supplied to the receiver circuitry through control lead 42. A receiving isolator 44 constructed from coiled coaxial cable is connected in series with control lead 42 between controller 20 and receiver circuitry 40.

The specific configuration of components in the radar tool as just described is designed to minimize the effects of electromagnetic coupling between the transmitting and receiving antennas. Control lead 32 connecting electromagnetic pulser 30 to electronic controller 20 tends to act as an RF antenna itself while energized by timing signals from the controller. When the coal-shale interface being mapped is close to radar tool 10, the transmitting and receiving antennas are both active at the same time and timing signals to the transmitter will frequently overlap the operation of the receiver. The correspondingly energized control lead 32 would thus induce spurious responses in the active receiver if control lead 32 were located anywhere near the receiver. The present invention reduces the effects of such coupling, however, by placing transmitting antenna 26 and its associated control lead 32 at a point intermediate the controller 20 and receiving antenna 36, thus removing control lead 32 from the vicinity of the receiving antenna.

Coupling effects are further reduced by transmitting isolator 34 and receiving isolator 44, which operate as RF chokes to attenuate any common mode RF signals respectively travelling along control lead 32 and control lead 42. Isolaters 34 and 44 prevent the leads 32, 42 from acting as antennas while the leads are energized by control signals. The outside of the isolators may be covered with an absorbing material such as Emerson & Cummings ECCOSORB TM SC100 to more nearly approximate the diameter of tool casing 16, thereby increasing the RF attenuation in the isolators while simultaneously blocking electromagnetic waves passing along the inside of the tool directly between the transmitting and receiving antennas.

Figure 4A:
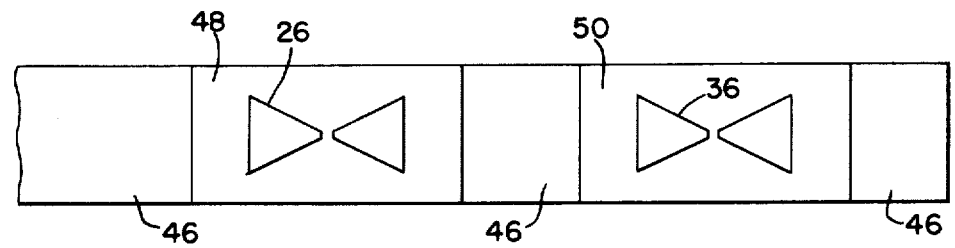
FIG. 4A is a top view of the radar tool showing the placement of a metal foil shielding.
Figure 4B:
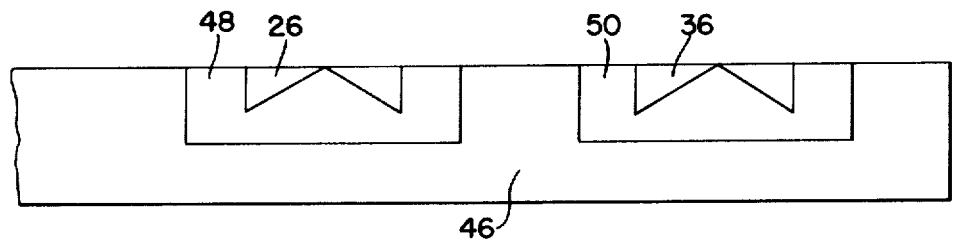
FIG. 4B is a side elevational view of the tool showing the placement of the metal foil shielding.

Shielding may also be employed to prevent the direct transmission of electromagnetic energy between transmitting antenna 26 and receiving antenna 36. As seen schematically in FIG. 4A and FIG. 4B, a cylindrical shielding element 46 constructed of copper foil or other suitable metal is placed around the inside diameter of casing 16. The shielding element covers the entire surface of tool 10, with the exception of openings 48, 50 which respectively accommodate transmitting antenna 26 and receiving antenna 36 to allow unimpeded operation of the antennas. If desired, control lead 42 may be positioned between the outside of the shielding element and the inside surface of casing 16 to prevent coupling of energy from the transmitting antenna into lead 42.

Figure 5:
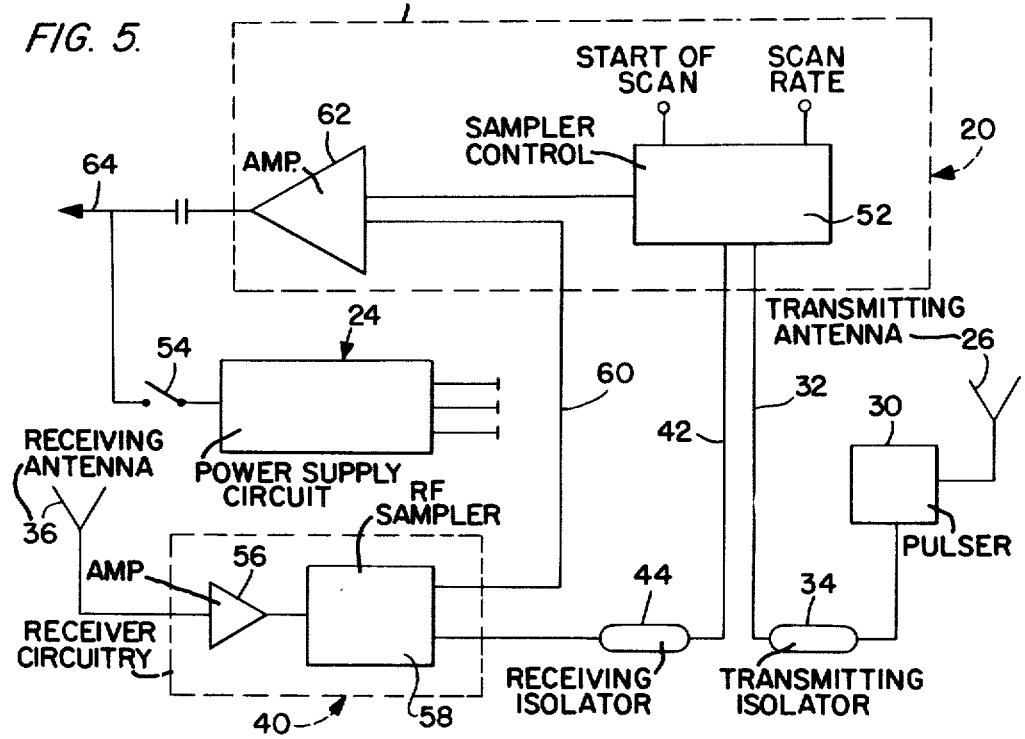
FIG. 5 is a schematic diagram of the radar tool electronics.

The circuit configuration of radar tool 10 is shown in the block diagram of FIG. 5. Electronic controller 20 includes a sampler control 52 which generates timing signals to control the timing of the radar scan sequence. Sampler control 52 is a conventional scan timing circuit similar in structure and function to the Tektronic model 7S11 timing unit. When the radar tool is properly positioned in the borehole, the tool operator outside the borehole activates on-off switch 54 to initiate the scan sequence. The scan rate is generally pre-set in the range from 10-30 Hz, but may be adjusted by the operator before the tool is inserted into the bore-hole.

Upon initaition of the scan sequence, sampler control 52 begins sending timing signals at a frequency of 200 KHz through control lead 32 and transmitting isolator 34 to electromagnetic pulser 30. Although 200 KHz is the preferred timing signal frequency, other timing signal frequencies in the range from 50-250 KHz may be employed with satisfactory results. In response to the timing signals, electromagnetic pulser 30 supplies transmitting antenna 26 with bursts of electromagnetic pulses which characteristically have a frequency on the order of 100 MHz-2 GHz. These high frequency electromagnetic pulses are emitted from transmitting antenna 26 into the surrounding coal and reflected from a coal-shale interface back to receiving antenna 36 as previously described.

The received pulses are fed to receiver circuitry 40, which includes an RF amplifier 56 and an RF sampler 58 under the control of sampler control 52. RF sampler 58 is an analog sample and hold circuit which follows the incoming pulses and capacitively stores representative pulses in response to a strobe signal which is generated by sampler control 52 and supplied to RF sampler 58 through control lead 42 and receiving isolator 44. The first strobe signal following initiation of the scan sequence coincides with the first timing signal of the sequence. Thereafter, the frequency of the strobe signals tracks the frequency of the timing signals but the time period between consecutive strobe signals is progressively increased by 0.25 nsec. increments to create a progressively increasing delay period between each strobe signal and each timing signal. For example, if the initial timing signal in a given scan sequence occurs at time $t_1$, the initial strobe signal also occurs at time $t_1$. The second timing signal will occur at time $t_2$, but the second strobe signal will not occur until time $t_2 + 0.25$ nsec. The third timing signal occurs at time $t_3$ while the third strobe signal occurs at time $t_3 + 0.50$ nsec. The delay between the timing and strobe signals thus continues to increase throughout the entire scan sequence, although the effective frequency of the strobe signals and the corresponding sampling rate both remain equal to the frequency of the timing signals. In this manner, RF sampler 58 is able to sequentially sample received pulses at progressively increasing time intervals following transmission of the pulses from transmitting antenna 26.

The pulses stored in sampler 58 are supplied through circuit wire 60 to audio frequency operational amplifier 62 in electronic controller 20. Amplifier 62 is triggered by a control signal from sampler control 52 at the same time as the scan sequence is initiated and operates to amplify the stored pulses for transmission to the outside of the borehole via surface cable 64.

Following completion of one scan sequence, sampler control 52 recycles and another scan sequence is begun. The pulses stored by RF sampler 58 during a single scan sequence and transmitted to the outside of the borehole by amplifier 62 and surface cable 64 provide a single data trace suitable for use in a conventional oscilloscope-type visual display or other monitoring circuitry.

The scan sequences continue as radar tool 10 is moved along the borehole. Changes in the pulse patterns as detected in the data traces serve to identify those stored pulses which have been reflected from the coal-shale interface at the roof or floor of the coal seam. The pulses identified as reflected pulses may in turn be employed as a measure of the distance between the borehole and the reflecting interface.

Only one embodiment of the invention has been shown and described in the foregoing specification. It is understood, however, that various changes and modifications in the form and details of the novel radar drill guidance system illustrated above may be made by those skilled in the art without departing from the scope and spirit of the invention. It is therefore the intention of the inventor to be limited only by the following claims.

We claim:

1. A radar guidance system for determining subterranean distances comprising a source of electromagnetic pulses, a transmitting means connected to said source of electromagnetic pulses to transmit said electromagnetic pulses into the earth, said transmitting means including a first bow-tie shaped dipole antenna, a receiving means positioned in spaced relationship to said transmitting means to receive electromagnetic energy which returns to the receiving means following the reflection of said electromagnetic pulses from various geological discontinuities in the earth, said receiving means including a second bow-tie shaped dipole antenna, and a control circuit means connected to both said source of electromagnetic pulses and said receiving means for controlling both the transmission of said electromagnetic pulses from said transmitting means and the reception of said electromagnetic energy by said receiving means, said control means being positioned in spaced relationship relative to said transmitting means such that said transmitting means is positioned intermediate said control circuit means and said receiving means to prevent electromagnetic coupling between said control circuit means and said receiving means.

2. A radar guidance system as set forth in claim 1, wherein a first reflecting means positioned below said first bow-tie shaped dipole antenna provides directionality to said transmitting means and a second reflecting means positioned below said second bowtie shaped dipole antenna provides directionality to said receiving means.

3. A radar guidance system as set forth in claim 1, wherein said source of electromagnetic pulses includes an electromagnetic pulser which supplies electromagnetic pulses having a frequency in the range between 100 MHz and 2 GHz.

4. A radar guidance system for determining subterranean distances including a source of electromagnetic pulses, a transmitting means connected to said source of electromagnetic pulses to transmit said electromagnetic pulses into the earth, a receiving means for receiving electromagnetic energy which returns to the receiving means following the reflection of said electromagnetic pulses from various geological discontinuities within the earth, a control circuit means for controlling both the transmission of said electromagnetic pulses from said transmitting means and the reception of said electromagnetic energy by said receiving means, a connecting means for connecting said control circuit means to both said source of electromagnetic pulses and said receiving means, a first RF choke means connected to said connecting means between said control circuit means and said transmitting means to attenuate any common mode RF signals travelling along said connecting means between said control circuit means and said transmitting means, and a second RF choke means connected to said connecting means between said control circuit means and said receiving means to attenuate any common mode RF signals travelling along said connection means between said control circuit means and said receiving means.

5. A radar guidance system as set forth in claim 4, wherein said first RF choke means is formed from a first coiled coaxial cable and said second RF choke means is formed from a second coiled coaxial cable.

6. A radar guidance system as set forth in claim 5, wherein both said first and second coiled coaxial cables are coated with lossy dielectrical material.

7. A radar guidance system as set forth in claim 4, wherein said transmitting means includes a first bow-tie shaped dipole antenna and said receiving means includes a second bow-tie shaped dipole antenna.

8. A radar guidance system as set forth in claim 8, wherein a first reflecting means positioned below said first bow-tie shaped dipole antenna provides directionality to said transmitting means and a second reflecting means positioned below said second bow-tie shaped dipole antenna provides directionality to said receiving means.

9. A radar guidance system for determining subterranean distances including a casing, a source of electromagnetic pulses mounted within said casing, a transmitting means mounted within said casing and connected to said source of electromagnetic pulses to transmit said electromagnetic pulses into the earth, a receiving means mounted within said casing in spaced relationship to said transmitting means to receive electromagnetic energy which returns to the receiving means following the reflection of said electromagnetic pulses from various geological discontinuities within the earth, said receiving means having a receiving antenna structure which intercepts said electromagnetic energy and receiver circuit means connected to said receiving antenna structure for tracking and storing said electromagnetic energy intercepted by said receiving antenna structure, said radar guidance system also including a control means mounted within said casing and connected to both said source of electromagnetic radiation and said receiver circuit means for controlling both the transmission of said electromagnetic pulses from said transmitting means and the reception of said electromagnetic energy by said receiving means, said control circuit means being positioned in spaced relationship relative to said transmitting means such that said transmitting means is positioned within said casing intermediate said control circuit means and both said receiving antenna structure and said receiver circuit means to prevent electromagnetic coupling between said control circuit means and said receiving means.

10. A radar guidance system for determining subterranean distances including a source of electromagnetic pulses, a transmitting means connected to said source of electromagnetic pulses to transmit said electromagnetic pulses into the earth, a receiving means positioned in spaced relationship to said transmitting means to receive electromagnetic energy which returns to said receiving means following the reflection of said electromagnetic pulses from various geological discontinuities within the earth, a control circuit means connected to both said source of electromagnetic pulses and said receiving means for controlling both the transmission of said electromagnetic pulses from said transmitting means and the reception of said electromagnetic energy by said receiving means, said control circuit means being positioned in spaced relationship relative to said transmitting means such that said transmitting means is positioned intermediate said control circuit means and said receiving means, said radar guidance system also including a casing which encloses said source of electromagnetic pulses, said transmitting means, said receiving means and said control circuit means, said casing having a shielding element mounted around the inner surface thereof to prevent direct electromagnetic coupling between said transmitting means and said receiving means.

11. A radar guidance system as set forth in claim 10, wherein said shielding element is formed from metal foil.

12. A radar guidance system as set forth in claim 11, wherein said metal foil is copper.

13. A radar guidance system for determining subterranean distances including a casing, a source of electromagnetic pulses mounted within said casing, a transmitting means mounted within said casing and connected to said source of electromagnetic pulses to transmit said electromagnetic pulses into the earth, a receiving means mounted within said casing in spaced relationship to said transmitting means to receive electromagnetic energy which returns to said receiving means following the reflection of said electromagnetic pulses from various geological discontinuities within the earth, a control circuit means mounted within said casing for controlling both the transmission of said electromagnetic pulses from said transmitting means and the reception of said electromagnetic energy by said receiving means, a connecting means for connecting said control circuit means to both said source of electromagnetic pulses and said receiving means such that said transmitting means is positioned intermediate said control circuit means and said receiving means to prevent electromagnetic coupling between said control circuit means and said receiving means, a first RF choke means mounted within said casing and connected to said connecting means between said control circuit means and said transmitting means to attenuate any common mode RF signals travelling along said connecting means between said control circuit means and said transmitting means, and a second RF choke means mounted within said casing and connected to said connecting means between said control circuit means and said receiving means to attenuate any common mode RF signals travelling along said connecting means between said control circuit means and said receiving means.

14. A radar guidance system as set forth in claim 13, wherein said first RF choke means is formed from a first cylindrically coiled coaxial cable and said second RF choke means is formed from a second cylindrically coiled coaxial cable.

15. A radar guidance system as set forth in claim 14, wherein said casing is cylindrical and the diameters of both said first cylindrically coiled coaxial cable and said second cylindrically coiled coaxial cable are equal to the inner diameter of said cylindrical casing.

16. A radar guidance system as set forth in claim 15, wherein both said first and second cylindrically coiled coaxial cables are coated with lossy dielectrical material.

17. A radar guidance system for determining subterranean distances comprising a casing, a source of electromagnetic pulses mounted within said casing, a transmitting means mounted within said casing and connected to said source of electromagnetic pulses to transmit said electromagnetic pulses into the earth, said transmitting means including a first bow-tie shaped dipole antenna, a receiving means mounted within said casing in spaced relationship to said transmitting means to receive electromagnetic energy which returns to said receiving means following the reflection of said electromagnetic pulses from various geological discontinuities within the earth, said receiving means including a second bow-tie shaped dipole antenna, and a control circuit means mounted within said casing and connected to both said source of electromagnetic pulses and said receiving means for controlling both the transmission of said electromagnetic pulses from said transmitting means and the reception of said electromagnetic energy by said receiving means, said control circuit means being positioned in spaced relationship relative to said transmitting means such that said transmitting means is positioned intermediate said control circuit means and said receiving means to prevent electromagnetic coupling between said control circuit means and said receiving means.

18. A radar guidance system as set forth in claim 17, wherein a first reflecting means positioned below said first bow-tie shaped dipole antenna provides directionality to said transmitting means and a second reflecting means positioned below said second bow-tie shaped dipole antenna provides directionality to said receiving means.

19. A radar guidance system as set forth in claims 10, 13 or 17, wherein said control circuit means includes a power source.

* * * * *